United States Patent [19]
Jeffries et al.

[11] Patent Number: 6,055,147
[45] Date of Patent: Apr. 25, 2000

[54] APPARATUS FOR PROVIDING INDEPENDENT OVER-CURRENT PROTECTION TO A PLURALITY OF ELECTRICAL DEVICES AND TRANSIENT-VOLTAGE SUPPRESSION SYSTEM EMPLOYING THE APPARATUS

[75] Inventors: Paul A. Jeffries, Grapevine; Fyodor M. Shterenberg, Plano; Asif Y. Jakwani, Irving; Qijun Chen, Spring; Thomas F. Crissler, Arlington, all of Tex.

[73] Assignee: Current Technology, Inc., Irving, Tex.

[21] Appl. No.: 09/103,983

[22] Filed: Jun. 24, 1998

[51] Int. Cl.$^7$ ........................................... H02H 5/00
[52] U.S. Cl. .................... 361/103; 361/56; 361/118; 361/124
[58] Field of Search .................. 361/56, 91, 111, 361/103, 124, 118, 119, 127

[56] References Cited

U.S. PATENT DOCUMENTS

| | | | |
|---|---|---|---|
| 4,152,743 | 5/1979 | Comstock | 361/56 |
| 5,153,806 | 10/1992 | Corey | 361/56 |
| 5,502,612 | 3/1996 | Osterhout et al. | 361/117 |

*Primary Examiner*—Stephen W. Jackson
*Attorney, Agent, or Firm*—Burleigh & Associates; Roger S. Burleigh

[57] ABSTRACT

An apparatus for providing independent over-current protection to a plurality of electrical devices and a transient-voltage suppression system employing the apparatus. In one embodiment, the apparatus includes a non-conductive body having a plurality of bores extending through the body from a first portion to a second portion of the body, a plurality of fusible elements corresponding to and disposed within the plurality of bores, each of the fusible elements having a first terminal proximate to the first portion of the body and a second terminal proximate to the second portion, and a common electrode coupled to the first terminal of each of the plurality of fusible elements. The common electrode is couplable to a source of electrical power and the second terminals of each of the plurality of fusible elements are couplable to an electrical device, such as a metal oxide varistor in a transient-voltage suppression system. Each of the fusible elements are operative to open-circuit when an electrical device coupled thereto causes an electrical current to flow through the fusible element in excess of a current rating of the fusible element.

72 Claims, 3 Drawing Sheets

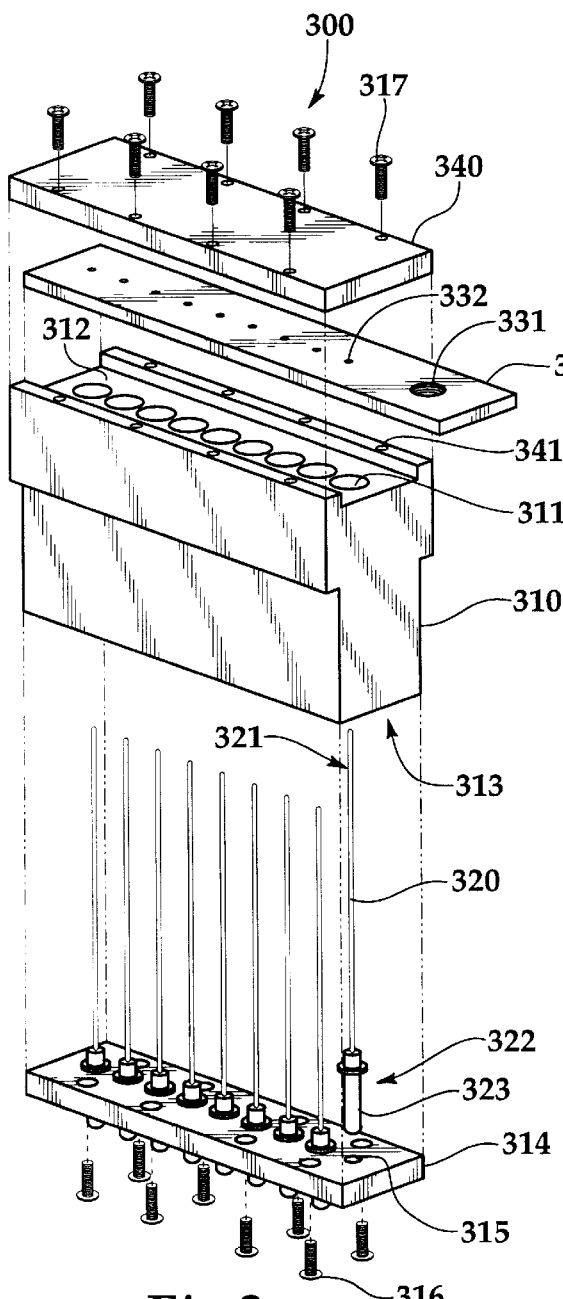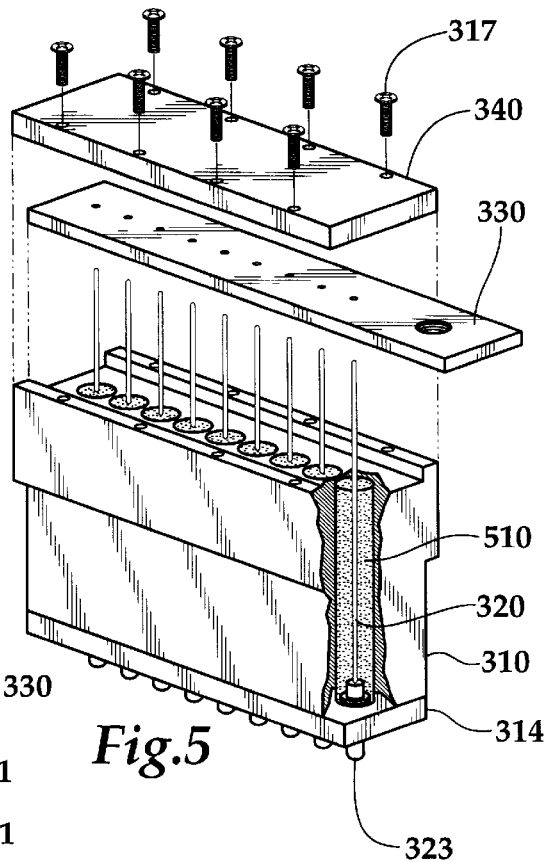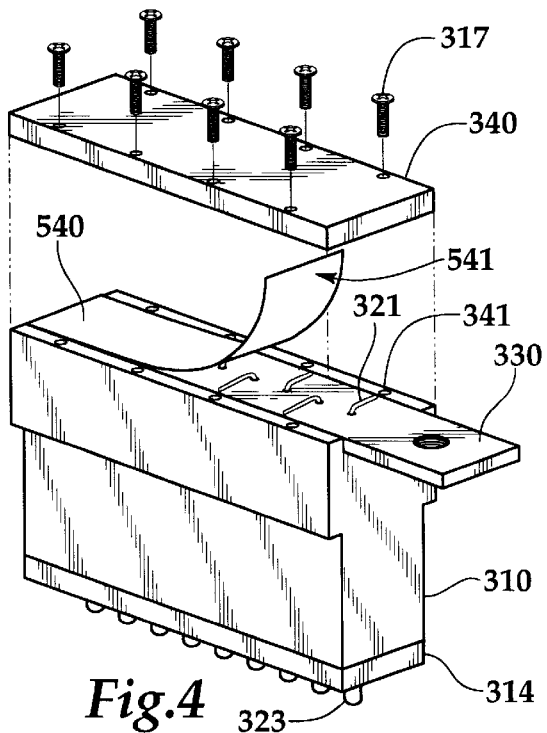

APPARATUS FOR PROVIDING INDEPENDENT OVER-CURRENT PROTECTION TO A PLURALITY OF ELECTRICAL DEVICES AND TRANSIENT-VOLTAGE SUPPRESSION SYSTEM EMPLOYING THE APPARATUS

TECHNICAL FIELD OF THE INVENTION

The present invention is directed, in general, to over-current protection apparatus and, more specifically, to an apparatus for providing independent over-current protection to a plurality of transient-voltage suppression devices.

BACKGROUND OF THE INVENTION

For many years, manufacturers of electronic systems have recommended that users take measures to isolate their hardware from transient overvoltages (also called "surges") that may cause damage to sensitive electronic devices. Transient voltage protection systems (so-called "surge suppressors") are designed to reduce transient voltages to levels below hardware-damage susceptibility thresholds; providing such protection can be achieved through the use of various types of transient-suppressing elements coupled between the phase, neutral and/or ground conductors of an electrical distribution system.

Conventional transient-suppressing elements typically assume a high impedance state under normal operating voltages. When the voltage across a transient-suppressing element exceeds a pre-determined threshold rating, however, the impedance of the element drops dramatically, essentially short-circuiting the electrical conductors and "shunting" the current associated with the transient voltage through the element and thus away from the sensitive electronic hardware to be protected.

To be reliable, a transient-suppressing element itself must be capable of handling many typical transient-voltage disturbances without internal degradation. This requirement dictates the use of heavy-duty components designed for the particular transient voltage environment in which such elements are to be used. In environments characterized by high-magnitude or frequently-occurring transients, however, multiple transient-suppressing elements may be required.

In many applications, the transient-suppressing elements typically employed are metal-oxide varistors ("MOVs"). When designing a system incorporating MOVs it is important to recognize the limitations of such devices, and the effects that the failure of any given MOV may have on the integrity of the total system. All MOV components have a maximum transient current rating; if the rating is exceeded, the MOV may fail. An MOV component may also fail if subjected to repeated operation, even if the maximum transient current rating is never exceeded. The number of repeated operations necessary to cause failure is a function of the magnitude of transient current conducted by an MOV during each operation: the lower the magnitude, the greater the number of operations necessary to cause failure. A designer of transient voltage protection systems must consider these electrical environment factors when selecting the number and type of MOVs to be used in a particular system. Therefore, to design a reliable transient voltage suppression system, a designer must consider both the maximum single-pulse transient current to which the system may be subjected, as well as the possible frequency of transients having lower-level current characteristics.

Although individual MOVs have a maximum transient current rating, it is possible to construct a device using multiple MOVs, in parallel combination, such that the MOVs share the total transient current. In this manner, each individual MOV must only conduct a fraction of the total transient current, thereby reducing the probability that any individual MOV will exceed its rated maximum transient current capacity. Furthermore, by using a plurality of individual MOVs, a transient voltage protection system can withstand a greater number of operations because of the lower magnitude of transient current conducted by each individual MOV.

When a transient voltage suppression system incorporates multiple MOVS, it is important that the system be designed such that the failure of an individual MOV does not cause a complete loss of system functionality. When an MOV fails, due to either exceeding its maximum transient current rating or frequent operation, it initially falls into a low impedance state, drawing a large steady-state current from the electrical distribution system. This current, if not interrupted, will quickly drive an MOV into thermal runaway, typically resulting in an explosive failure of the MOV.

To avoid the explosive failure of MOVs, an appropriately-rated current-limiting element, such as a fuse, should be employed in series with MOVs. If the transient-suppressing device incorporates a plurality of parallel-coupled MOVs, however, a single fuse in series with the parallel combination of MOVs may open-circuit even if only a single MOV fails, resulting in a disconnection of the remaining functional MOVs from the electrical distribution system. Therefore, better-designed systems incorporate individual fuses for each MOV, such that the failure of an individual MOV will result only in the opening of the fuse coupled in series with the failed MOV; the remaining functional MOVs remain connected to the electrical distribution system, via their own fuses, to provide continued transient voltage protection.

In the prior art, there are transient suppression circuits that incorporate a plurality of parallel-coupled MOVs with an individual fuse provided for overcurrent protection of the MOVs. U.S. Pat. No. 5,153,806 to Corey teaches the use of a single fuse to protect a plurality of MOVs, as well as an alarm circuit for indicating when the fuse has open-circuited. Similarly, U.S. Pat. No. 4,271,466 to Comstock teaches the use of a single fuse in series with a plurality of MOVs, as well as a light-emitting diode ("LED"), coupled in parallel with the fuse, to emit light when the fuse is blown. The deficiencies of these types of circuits is that the failure of a single MOV can cause the fuse to fail whereby the remaining functional MOVs are decoupled from the circuit; i.e., the remaining functional MOVs are disconnected from the electrical distribution system and thus cannot provide continued protection from transient voltages.

There are also a limited number of transient suppression devices that employ multiple over-current limiting elements with multiple parallel-coupled MOVs or other transient suppression devices. Such devices known in the prior art, however, typically employ a bare fusible element mounted on the printed circuit board on which the MOVs are mounted. When an MOV associated with a particular fusible element fails, the fusible element typically open circuits. The open-circuiting of a fusible element is often accompanied by electrical arcing, which is particularly true in the area of transient suppression devices because of the large voltages and currents usually present when a suppression device fails. Because of the close proximity of the bare fusible elements, the electrical arcing of one fusible element can result in the destruction of adjacent elements, thereby decoupling remaining functional MOVs from the circuit and further limiting the remaining suppression capacity of the device.

The inadequacy of the prior art is that the failure of a single MOV component may cause a fuse in series with a plurality of parallel-coupled MOVs to open-circuit, thus eliminating all transient voltage suppression capability of the parallel-coupled MOVs. In prior art circuits that have employed multiple bare fusible elements with multiple parallel-coupled MOVs (or other transient suppression devices), the design of such circuits is such that the failure of a bare fusible element causes electrical arcing that can result in the destruction of adjacent fusible elements, thus resulting in further degradation of the suppression capacity of the circuit.

Therefore, what is needed in the art are apparatus for providing over-current protection to a plurality of parallel-coupled transient-suppression devices; the apparatus should provide independent over-current protection to each transient-suppression device in a combination of parallel-coupled transient-suppression devices; the apparatus should also ensure that each over-current protection element is sufficiently isolated from any arcing that may be associated with the failure of another over-current protection element in the apparatus.

SUMMARY OF THE INVENTION

To address the above-discussed deficiencies of the prior art, the present invention provides an apparatus for providing independent over-current protection to a plurality of electrical devices and a transient-voltage suppression system employing the apparatus. In one embodiment, the apparatus includes a non-conductive body having a plurality of bores extending through the body from a first portion to a second portion of the body, a plurality of fusible elements corresponding to and disposed within the plurality of bores, each of the fusible elements having a first terminal proximate to the first portion of the body and a second terminal proximate to the second portion, and a common electrode coupled to the first terminal of each of the plurality of fusible elements. The common electrode is couplable to a source of electrical power and the second terminals of each of the plurality of fusible elements are couplable to an electrical device, such as a metal oxide varistor in a transient-voltage suppression system. Each of the fusible elements are operative to open-circuit when an electrical device coupled thereto causes an electrical current to flow through the fusible element in excess of a current rating of the fusible element. The non-conductive body includes a wall structure between each of the fusible elements that provides isolation and shielding from electrical arcing due to the open-circuiting of an adjacent fusible element.

Other embodiments of the invention are described hereinafter; in particular, various alternative, and equivalent, structures for isolating and shielding the plurality of fusible elements are described. Although not specifically illustrated, such alternative and equivalent structures are within the scope of the invention as claimed in its broadest form.

The foregoing has outlined rather broadly the features and technical advantages of the present invention so that those skilled in the art may better understand the detailed description of the invention that follows. Additional features and advantages of the invention will be described hereinafter that form the subject of the claims recited hereinafter. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates an exploded perspective view of an exemplary over-current protection apparatus in accordance with the principles of the present invention;

FIG. 4 illustrates a partially-exploded perspective view of the exemplary apparatus shown in FIG. 3, including additional features in accordance with the principles of the present invention;

FIG. 5 illustrates a second partially-exploded perspective view of the exemplary apparatus shown in FIG. 3, including additional features in accordance with the principles of the present invention.

DETAILED DESCRIPTION

Figure 1:
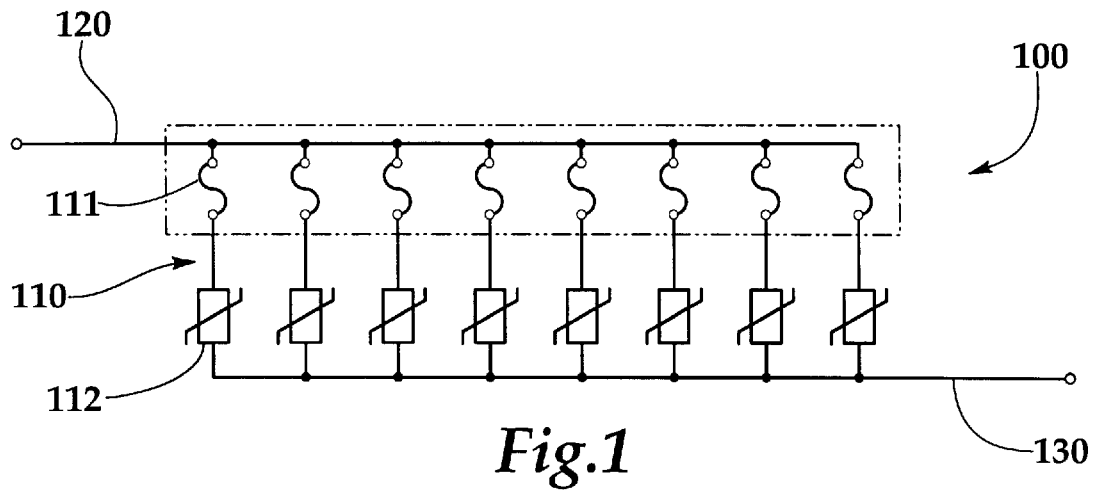
FIG. 1 illustrates an exemplary transient-voltage suppression circuit.

Referring initially to FIG. 1, illustrated is an exemplary transient-voltage suppression circuit 100. The transient-voltage suppression circuit 100 includes a plurality of parallel-coupled circuits, generally designated 110, each of which includes a current-limiting element 111 and a transient-suppressing element 112. Those skilled in the art will readily appreciate that the transient-voltage suppression circuit 100 may have any desired number of the parallel-coupled circuits 110, and that the total transient-suppressing capacity of the transient-voltage suppression circuit 100 is a function of the number of parallel-coupled circuits 110.

In the exemplary transient-voltage suppression circuit 100, the current-limiting elements 111 are fuses and the transient-suppressing elements 112, which are each coupled in series with a fuse 111, are metal oxide varistors ("MOV"). Each series-coupled fuse 111 and MOV 112 is coupled between a bus 120 and a bus 130. The bus 120 is couplable to a first electrical conductor of a power distribution system (not shown), and the bus 130 is couplable to a second electrical conductor of the power distribution system; the first and second electrical conductors may be, for example, a phase and neutral conductor (or phase and ground conductor), respectively. An electrical load (not shown) to be protected by the transient-voltage suppression circuit 100 would also be coupled to the first and second electrical conductors.

Figure 2:
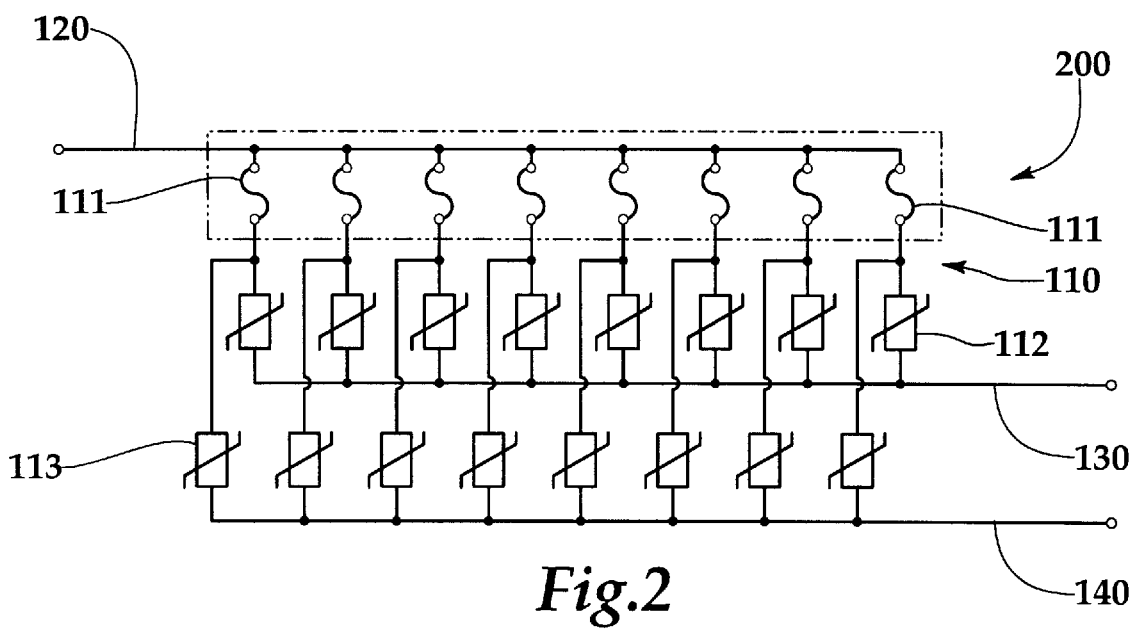
FIG. 2 illustrates a second exemplary transient-voltage suppression circuit.

FIG. 2 illustrates a second exemplary transient-voltage suppression circuit 200. The transient-voltage suppression circuit 200 is similar to the circuit 100 illustrated in FIG. 1, but further includes a second plurality of parallel-coupled transient-suppressing elements (e.g., MOVs), generally designated 113, coupled between current-limiting elements (e.g. fuses) 111 and a bus 140. The second exemplary transient-voltage suppression circuit 200 provides the capability for a single current-limiting element to provide over-current protection to a plurality of transient-suppressing elements that provide transient suppression in more than one mode. For example, if buses 120, 130 and 140 are coupled to the phase, neutral and ground conductors, respectively, of a power distribution system, the transient suppressing elements 112 provide phase-to-neutral transient suppression, and the transient suppressing elements 113 provide phase-to-ground transient protection, while the current-limiting elements 111 provide over-current protection for both transient suppression modes.

When exposed to a transient voltage occurring between the electrical conductors of a power distribution system to which either circuit 100 or circuit 200 is coupled, the impedance of each MOV 112, 113 changes by many orders of magnitude from a substantially high-impedance state to a very low impedance state, i.e., a highly conductive state, thereby "shunting" the current associated with the transient voltage through the MOV and thus away from the sensitive electronic hardware to be protected. Thus, the MOVs can be electrically connected in parallel between electrical conductors of a power distribution system to provide protection from transient voltages to an electrical load also coupled to the electrical conductors.

As those skilled in the art understand, when an MOV is subjected to a transient voltage beyond its peak current/energy rating, it initially fails in a short-circuit mode. An MOV may also fail when operated at a steady-state voltage well beyond its nominal voltage rating, or if subjected to repeated operations due to transient voltages having associated current levels below the peak current/energy rating for the MOV. When an MOV fails in the short-circuit mode, the current through the MOV becomes limited mainly by the source impedance of the power distribution system to which the MOV is coupled. Consequently, a large amount of energy can be introduced into the MOV, causing mechanical rupture of the package accompanied by expulsion of package material; this failure mode may be prevented by proper selection of a current-limiting element that "clears" the fault. The current-limiting element 111 interrupts the fault current that is caused to flow through the MOV (as well as the current-limiting element) due to the failure of the MOV.

In many conventional transient-voltage suppression circuits, a bare fusible element, such as an uninsulated copper wire, is often used as a current-limiting element in series with MOV transient suppressing elements. The bare fusible elements are typically mounted on a printed circuit board to which the MOVs are also mounted. It has been recognized that when such bare fusible elements are mounted in close proximity, the electrical arcing resulting from the open-circuiting of one fusible element can cause damage to other adjacent fusible elements, as well as other adjacent electrical components. The damage caused to an adjacent fusible element may cause that element to open-circuit, thereby eliminating an additional MOV from the circuit and degrading the overall transient suppression capacity of the circuit. Furthermore, the electrical arcing of a fusible element can cause arc "tracking" on the circuit board; the electrical arcing results in carbon deposition on the circuit board, thus forming a conductive path, or "track," which helps to sustain the electrical arc and prevent clearing of the fault. It is an object of the present invention to overcome these deficiencies of the prior art.

Turning now to FIG. 3, illustrated is an exploded perspective view of an exemplary over-current protection apparatus 300 in accordance with the principles of the present invention. In the embodiment illustrated, the over-current protection apparatus 300 includes a non-conductive body 310, which can be made from a variety of materials, such as injection-molded fiberglass. A plurality of bores, generally designated 311, extend through the body 310 from a first portion 312 to a second portion 313 of the body. A like plurality of fusible elements, generally designated 320, are disposed within the plurality of bores 311; the fusible elements 320 may be formed from various conventional materials known in the art, including copper or silver filaments. When assembled, the fusible elements 320 extend through the body 310 such that a first terminal 321 is proximate to the first portion 311 of the body 310 and a second terminal 322 is proximate to the second portion 313.

Although the body 310 is illustrated as a unitary structure, the body could be formed from a plurality of elements sufficient to form a non-unitary, non-conductive wall structure between adjacent ones of the plurality of fusible elements 320; a non-conductive wall structure between each of the fusible elements 320 will provide isolation and shielding from electrical arcing due to the failure of an adjacent fusible element, thereby improving the reliability of the over-current protection apparatus 300. In an additional alternate embodiment, a non-conductive body could surround all of the fusible elements, without a non-conductive wall structure separating the individual fusible elements. The body can be filled with a material, such as a potting compound or a dry silica sand, to surround and insulate the fusible elements disposed within the non-conductive body. Silica sand provides good arc-quenching characteristics, thereby helping to decrease the necessary time for a fusible element disposed within the silica sand to open-circuit upon exceeding its maximum current rating.

The over-current protection apparatus further includes a common electrode 330, which is coupled to the first terminal 321 of each of the fusible elements 320. The common electrode can be formed from any conductive material, such as copper, and preferably includes a coupling means, such as threaded hole 331, for electrically-coupling the common electrode 330 to a source of electrical power. In a system employing the overcurrent protection apparatus 300, the second terminal 322 of each fusible element 320 is coupled to an electrical device, such as a transient-suppressing element (e.g., MOVs 112, 113 of FIG. 2), whereby each of the fusible elements 320 is operative to open-circuit when an electrical device coupled thereto causes an electrical current to flow through the fusible element in excess of a current rating of the fusible element.

In the embodiment illustrated, a member 314, having a plurality of holes 315 therethrough, is provided for coupling to the second portion 313 of the body 310. The member 314 is coupled to the body 310 using screws, generally designated 316, that pass through member 314 and into holes (not shown) in the second portion 313 of the body 310. Alternatively, the member 314 can be coupled to the body 310 using an adhesive or other coupling means, or can be formed integrally with the body 310, such that a coupling means is not required.

At least a portion of the second terminal 322 of each of the fusible elements 320 extends through a corresponding one of the plurality of holes 315 in member 314. In one embodiment, the member 314 is non-conductive, whereby the second terminals 322 of the fusible elements 320 are electrically-isolated; electrically-isolating the second terminals of the fusible elements 320 allows the apparatus 300 to provide independent over-current protection to a plurality of electrical devices coupled to the second terminals 322.

In the embodiment illustrated, a conductive pin 323 is coupled to the fusible elements 320 to form the second terminal 322. The conductive pin 323 may be soldered or crimped to the fusible element 320. Preferably, the conductive pin 323 has a diameter corresponding to a mounting hole provided in a printed circuit board (not shown) with which the over-current protection apparatus 300 is to be used; the conductive pins 323 are suitable for soldering to conductive circuit traces on the printed circuit board whereby the fusible elements 320 can be electrically-coupled to electrical devices also mounted on the printed circuit board. Alternatively, the size and arrangement of the conductive pins 323 may correspond to a receptacle designed to removably receive the apparatus 300, whereby the apparatus 300 can be replaced if one or more of the fusible elements 320 fails.

In the embodiment illustrated, the common electrode 330 is an elongated member having a plurality of holes, generally designated 332, therethrough. The holes 332 are located in common electrode 330 such that each hole will be centered over a corresponding bore 311 in body 310 when assembled. When the over-current protection apparatus 300 is assembled, at least a portion of the first terminal 321 of each of the fusible elements 320 extends through a corresponding one of the holes 332. As illustrated in FIG. 4, the portions of the first terminals 321 extending through the holes 332 are folded back proximate to the upper surface of the common electrode 330.

In the embodiment illustrated, the over-current protection apparatus 300 further includes a keeper 340. The keeper 340 is coupled to the body 310 using screws, generally designated 317, that pass through keeper 340 and into holes, generally designated 341, in the first portion 312 of the body 310. Alternatively, the keeper 340 can be coupled to the body 310 using an adhesive or other coupling means. The portions of the first terminals 321 of the fusible elements 320 extending through the holes 332 in the central portion of common electrode 330 are captured between the keeper 340 and the common electrode 330. The keeper 340 may be constructed from either a conductive or non-conductive material.

As an alternative to providing holes 332 in common electrode 330 for coupling the fusible elements 320 thereto, the common electrode 330 may have slots extending from an edge of the electrode toward the center portion, whereby the first terminals 321 of the fusible elements 320 may be slidably inserted through the electrode, rather than threaded through holes 332. Another alternative is to simply capture the first terminals 321 of each fusible element 320 between the common electrode 330 and the body 310, thereby eliminating the need to provide holes, or slots, in common electrode 330, and further eliminating the assembly step of threading the first terminals 321 through the holes or slots. If this technique is employed, the keeper 340 can be eliminated, and the common electrode 340 can be directly coupled to the body 310 using, for example, screws passing through mounting holes (not shown) in the electrode and into the body 310. Those skilled in the art will readily perceive of other equivalent means for coupling the first terminals 321 of fusible elements 320 to the common electrode 330, and for coupling the common electrode 330 to the body 310.

Turning now to FIG. 4, illustrated is a partially-exploded perspective view of the exemplary apparatus shown in FIG. 3, including additional features in accordance with the principles of the present invention; FIG. 4 illustrates a further means of securing the first terminals 321 of fusible elements 320 to the common electrode 330. In the embodiment illustrated in FIG. 4, a keeper 540 is used to secure the portions of the first terminals 321 extending through the common electrode 330 to an upper surface of the electrode. The portions of the first terminals 321 extending through the common electrode 330 are folded back proximate to the upper surface of the common electrode 330. In one embodiment, the keeper 540 has an adhesive surface 541; the keeper is laid over the common electrode 330 whereby the portions of the first terminals 321 are captured between the keeper 540 and the common electrode 330. Although not necessary, the keeper 540 can be fabricated from a conductive material.

As illustrated in FIG. 4, the keeper 540 can also be used in combination with the keeper 340, which is coupled to the body 310 using screws, generally designated 317, that pass through keeper 340 and into holes, generally designated 341, in the body 310. In this embodiment, it is not necessary for the keeper 540 to have an adhesive surface to secure the first terminals 321 of fusible elements 320 to the common electrode 330. The keeper 540 can function as a gasket, compressed between the keeper 340 and common electrode 330, that forms around each of the first terminals 321 and provides for uniform contact between each of the first terminals 321 and common electrode 330. Using the embodiments described herein, those skilled in the art will conceive of other equivalent structures for coupling the fusible elements 320 to the common electrode and the common electrode to the body 310; such equivalent structures are within the broad scope of the invention.

Turning now to FIG. 5, illustrated is a second partially-exploded perspective view of the exemplary apparatus 300 shown in FIG. 3, including additional features in accordance with the principles of the present invention. Once member 314 is coupled to the body 310, the bores 311 can be filled with any desirable material 510, such as a potting compound, to surround the fusible elements disposed within the bores 311. Preferably, the bores 311 are filled with a dry silica sand; silica sand provides good arc-quenching characteristics, thereby helping to decrease the necessary time for a fusible element disposed within the silica sand to open-circuit upon exceeding its maximum current rating.

In the embodiments specifically shown and described herein, the center axes of the plurality of bores 311 are parallel and coplanar. Alternatively, however, a structure can be constructed wherein the center axes of the bores are not parallel, not coplanar, or even possibly neither parallel or coplanar. For example, the bores could be radially-disposed about a centrally-located common electrode; i.e., the common electrode could be a "hub" from which the bores extended like "spokes." Although the embodiment disclosed is only shown in a specific physical configuration, those skilled in the art will readily perceive of various alternative physical configurations suitable to provide equivalent functionality for various specific applications.

Figure 6:
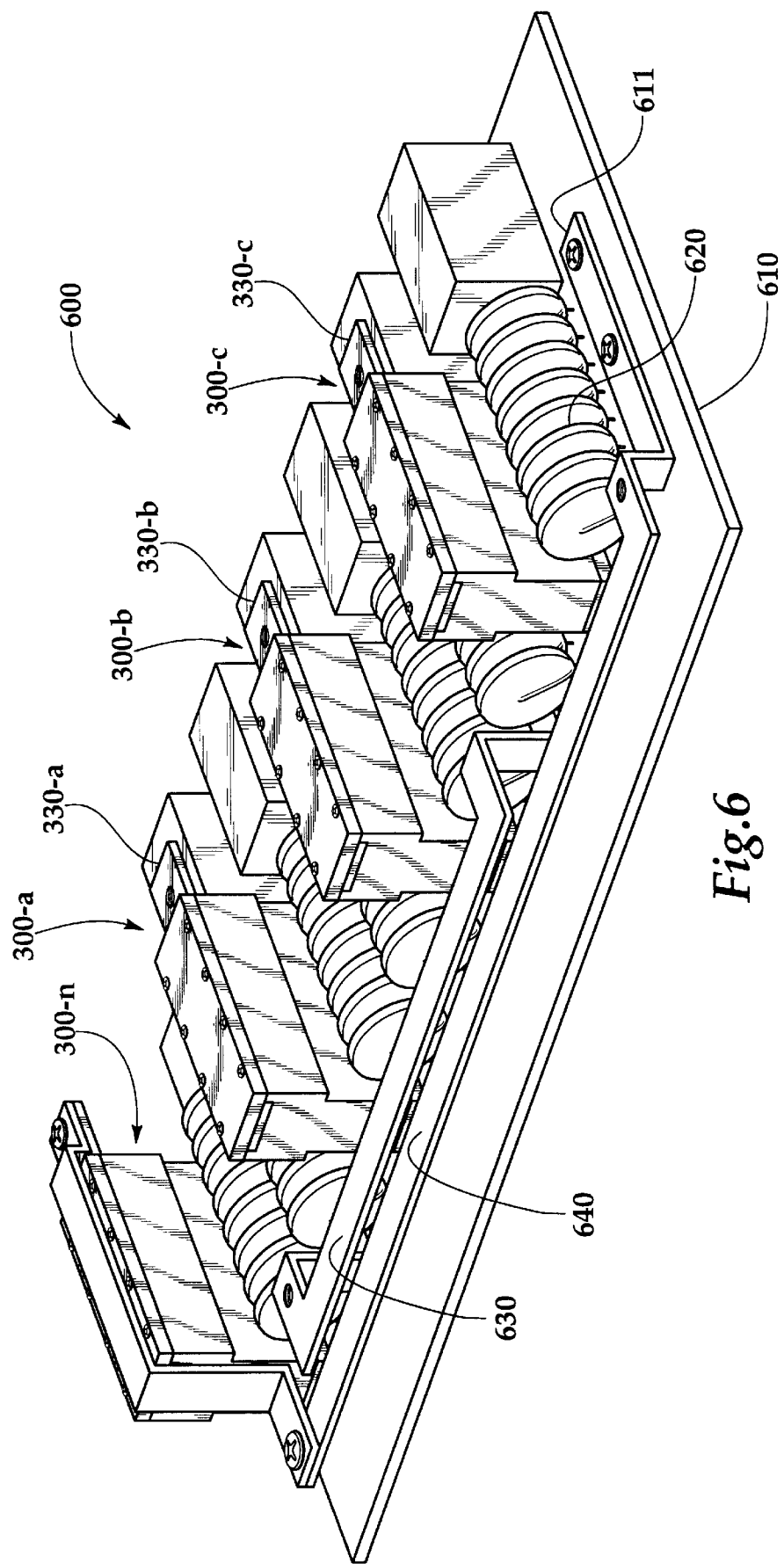
FIG. 6 illustrates a perspective view of an exemplary transient-voltage suppression system employing the over-current protection apparatus shown in FIG. 3, including additional features in accordance with the principles of the present invention.

Turning now to FIG. 6, illustrated is a perspective view of an exemplary transient-voltage suppression system 600 employing the over-current protection apparatus 300 shown in FIG. 3, including additional features in accordance with the principles of the present invention. The electrical circuit illustrated in FIG. 2, described hereinabove, corresponds in relevant part to the electrical configuration of the components illustrated in the exemplary transient-voltage suppression system 600. The system 600 includes, among other things, a printed circuit board 610, a plurality of transient-suppressing elements, generally designated 620, and a plurality of the over-current protection apparatus 300 shown in and described with reference to FIGS. 3, 4 and 5, hereinabove.

In the embodiment illustrated in FIG. 6, the transient-suppressing elements 620 are MOVs. Each of the MOVs 620 have first and second terminals; the first terminals of each of the MOVs 620 are electrically coupled to a common bus on the printed circuit board and each of the second terminals of the MOVs 620 are coupled via the printed circuit board 610 to a fusible element contained in one of the over-current protection apparatus 300. For example, as illustrated in FIG. 2, each of the MOVs 112 has one terminal coupled to a fusible element 111 and one terminal coupled to bus 130, which is "common" to all of the MOVs 112; similarly, each of the MOVs 113 has one terminal coupled to a fusible element 111 and one terminal coupled to bus 140, which is "common" to all of the MOVs 113.

The buses 130 and 140 illustrated in FIG. 2 can be implemented as printed circuit traces on printed circuit board 610; alternatively, or in addition to printed circuit traces, the "common" buses 130 and 140 shown in FIG. 2 can be copper bus bars mechanically and electrically coupled to the printed circuit board 610; i.e., the copper bus bars 630 and 640 shown in FIG. 6 correspond to buses 130 and 140, respectively, shown in FIG. 2. The use of a copper bus bar coupled to, and overlaying a circuit trace on, a printed circuit board can greatly increase the amount of current that can be handled by the transient-voltage suppression system 600. In the embodiment illustrated, the copper bus bars 630, 640 are coupled to the printed circuit board 610 with fasteners, generally designated 611, extending through the copper bus bar and at least partially through the printed circuit board 610. For example, the fasteners 611 can be self-threading screws. Alternatively, or in addition to fasteners 611, the copper bus bars 630, 640 can be coupled to the printed circuit board 610 using a conductive adhesive.

The exemplary transient-voltage suppression system 600 provides a transient suppression system suitable for use in a three-phase electrical distribution system, providing seven modes of protection: phase-to-ground protection and phase-to-neutral protection for all three phases, as well as neutral-to-ground protection. Those skilled in the art will recognize that seven modes of protection are possible by employing three of the circuits illustrated in FIG. 2 and one of the circuit illustrated in FIG. 1. For example, phase-to-ground and phase-to-neutral protection is provided using three of the circuit shown in FIG. 2 where buses 130 and 140 in each circuit correspond to the neutral and ground buses 630 and 640, respectively, of FIG. 6, and the bus 120 in each circuit corresponds to one of the three phases, which would be coupled to common terminals 330-a, 330-b and 330-c of over-current protection apparatus 300-a, 300-b and 300-c, respectively; Similarly, neutral to ground protection is provided using one of the circuit shown in FIG. 1, where buses 120 and 130 correspond to the neutral and ground buses 630 and 640, respectively, of FIG. 6. Those skilled in the art will readily perceive of various alternative circuit configurations for different electrical distribution systems to which the transient-voltage suppression system 600 can be adapted. The principles of the present invention are not limited to a particular transient-suppression circuit or electrical distribution system configuration.

From the foregoing detailed description, it is apparent that the present invention discloses an apparatus for providing independent over-current protection to a plurality of electrical devices and a transient-voltage suppression system employing the apparatus. Although the present invention and its advantages have been described in detail, those skilled in the art should understand that they can make various changes, substitutions and alterations herein without departing from the spirit and scope of the invention in its broadest form.

What is claimed is:

1. An apparatus for providing independent over-current protection to a plurality of electrical devices, said apparatus comprising:
    a non-conductive body having a plurality of bores extending through said body from a first portion to a second portion of said body;
    a plurality of fusible elements corresponding to and disposed within said plurality of bores, each of said fusible elements having a first terminal proximate to said first portion of said body and a second terminal proximate to said second portion; and
    a common electrode coupled to said first terminal of each of said plurality of fusible elements and couplable to a source of electrical power, said second terminals of each of said plurality of fusible elements couplable to at least one of said plurality of electrical devices, each of said plurality of fusible elements operative to open-circuit when an electrical device coupled thereto causes an electrical current to flow through said fusible element in excess of a current rating of said fusible element.

2. The apparatus recited in claim 1, wherein said second portion of said non-conductive body comprises a member having a plurality of holes therethrough and at least a portion of said second terminal of each of said plurality of fusible elements extends through a corresponding one of said plurality of holes.

3. The apparatus recited in claim 2, wherein said member is non-conductive, whereby said second terminals of said plurality of fusible elements are electrically-isolated.

4. The apparatus recited in claim 1, wherein said second terminals of said fusible elements comprise a conductive pin extending from said second portion of said non-conductive body.

5. The apparatus recited in claim 4, wherein said conductive pins are adapted for coupling to conductive circuit traces on a printed circuit board for coupling to said plurality of electrical devices.

6. The apparatus recited in claim 1, wherein said common electrode comprises an elongated member having a plurality of holes therethrough and at least a portion of said first terminal of each of said plurality of fusible elements extends through a corresponding one of said plurality of holes.

7. The apparatus recited in claim 6, wherein the portions of said first terminals extending through said holes are proximate to a surface of said common electrode.

8. The apparatus recited in claim 7, further comprising a keeper, said portions of said first terminals extending through said common electrode being captured between said keeper and said common electrode.

9. The apparatus recited in claim 8, wherein said keeper comprises an adhesive surface, said adhesive surface mating with said surface of said common electrode whereby said portions of said first terminals are captured between said keeper and said surface of said common electrode.

10. The apparatus recited in claim 8, wherein said keeper is conductive.

11. The apparatus recited in claim 1, wherein the center axes of said plurality of bores are parallel.

12. The apparatus recited in claim 1, wherein the center axes of said plurality of bores are coplanar.

13. The apparatus recited in claim 1, wherein said non-conductive body comprises fiberglass.

14. The apparatus recited in claim 1, wherein said fusible elements comprise silver filaments.

15. The apparatus recited in claim 1, wherein said common electrode comprises a copper bus bar.

16. A system for providing transient-voltage suppression, said system comprising:

a printed circuit board;

a plurality of transient-suppressing elements mechanically and electrically coupled to said printed circuit board; and a device for providing independent over-current protection to said plurality of transient-suppressing elements, said over-current protection device comprising:

a non-conductive body having a plurality of bores extending through said body from a first portion to a second portion of said body;

a plurality of fusible elements corresponding to and disposed within said plurality of bores, each of said fusible elements having a first terminal proximate to said first portion of said body and a second terminal proximate to said second portion; and a common electrode coupled to said first terminal of each of said plurality of fusible elements and couplable to a source of electrical power, said second terminals of each of said plurality of fusible elements coupled to at least one of said plurality of transient-suppressing elements, each of said plurality of fusible elements operative to open-circuit when a transient-suppressing element coupled thereto causes an electrical current to flow through said fusible element in excess of a current rating of said fusible element.

17. The system recited in claim 16, wherein said second portion of said non-conductive body comprises a member having a plurality of holes therethrough and at least a portion of said second terminal of each of said plurality of fusible elements extends through a corresponding one of said plurality of holes.

18. The system recited in claim 17, wherein said member is non-conductive, whereby said second terminals of said plurality of fusible elements are electrically-isolated.

19. The system recited in claim 16, wherein said second terminals of said fusible elements comprise a conductive pin extending from said second portion of said non-conductive body.

20. The system recited in claim 19, wherein said conductive pins are coupled to said transient-suppressing devices via conductive circuit traces on said printed circuit board.

21. The system recited in claim 16, wherein said common electrode comprises an elongated member having a plurality of holes therethrough and at least a portion of said first terminal of each of said plurality of fusible elements extends through a corresponding one of said plurality of holes.

22. The system recited in claim 21, wherein the portions of said first terminals extending through said holes are proximate to a surface of said common electrode.

23. The system recited in claim 22, further comprising a keeper, said portions of said first terminals extending through said common electrode being captured between said keeper and said common electrode.

24. The system recited in claim 23, wherein said keeper comprises an adhesive surface, said adhesive surface mating with said surface of said common electrode whereby said portions of said first terminals are captured between said keeper and said surface of said common electrode.

25. The system recited in claim 23, wherein said keeper is conductive.

26. The system recited in claim 16, wherein the center axes of said plurality of bores are parallel.

27. The system recited in claim 16, wherein the center axes of said plurality of bores are coplanar.

28. The system recited in claim 16, wherein said non-conductive body comprises fiberglass.

29. The system recited in claim 16, wherein said fusible elements comprise silver filaments.

30. The system recited in claim 16, wherein said common electrode comprises a copper bus bar.

31. The system recited in claim 16, wherein said transient-suppressing elements are metal oxide varistors.

32. The system recited in claim 16, wherein each of said plurality of transient-suppressing elements comprise first and second terminals, said first terminals of each of said transient-suppressing elements electrically coupled to a common bus on said printed circuit board and each of said second terminals of said transient-suppressing elements are coupled via said printed circuit board to one of said fusible elements.

33. The system recited in claim 32, wherein said common bus on said printed circuit board comprises a copper bus bar mechanically and electrically coupled to said printed circuit board.

34. The system recited in claim 33, wherein said copper bus bar is coupled to said printed circuit board with a fastener extending through said copper bus bar and at least partially through said printed circuit board.

35. The system recited in claim 34, wherein said fastener comprises a self-threading screw.

36. A system for providing transient-voltage suppression, said system comprising:

a printed circuit board;

a plurality of transient-suppressing elements mechanically and electrically coupled to said printed circuit board;

a plurality of fusible elements, each of said fusible elements having a first terminal and a second terminal;

a non-conductive wall structure between adjacent ones of said plurality of fusible elements, said non-conductive wall structure isolating and shielding each of said fusible elements from electrical arcing due to the failure of another of said fusible elements; and a common electrode coupled to said first terminal of each of said plurality of fusible elements and couplable to a source of electrical power, said second terminals of each of said plurality of fusible elements coupled to at least one of said plurality of transient-suppressing elements, each of said plurality of fusible elements operative to open-circuit when a transient-suppressing element coupled thereto causes an electrical current to flow through said fusible element in excess of a current rating of said fusible element.

37. The system recited in claim 36, wherein said non-conductive wall structure comprises a body having a plurality of bores extending through said body from a first portion to a second portion of said body, said plurality of fusible elements corresponding to and disposed within said plurality of bores, each of said first terminals proximate to said first portion of said body and each of said second terminals proximate to said second portion.

38. The system recited in claim 37, wherein said second portion of said body comprises a member having a plurality of holes therethrough and at least a portion of said second terminal of each of said plurality of fusible elements extends through a corresponding one of said plurality of holes.

39. The system recited in claim 38, wherein said member is non-conductive, whereby said second terminals of said plurality of fusible elements are electrically-isolated.

40. The system recited in claim 37, wherein said second terminals of said fusible elements comprise a conductive pin extending from said second portion of said body.

41. The system recited in claim 40, wherein said conductive pins are coupled to said transient-suppressing devices via conductive circuit traces on said printed circuit board.

42. The system recited in claim 36, wherein said common electrode comprises an elongated member having a plurality of holes therethrough and at least a portion of said first terminal of each of said plurality of fusible elements extends through a corresponding one of said plurality of holes.

43. The system recited in claim 42, wherein the portions of said first terminals extending through said holes are proximate to a surface of said common electrode.

44. The system recited in claim 43, further comprising a keeper, said portions of said first terminals extending through said common electrode being captured between said keeper and said common electrode.

45. The system recited in claim 44, wherein said keeper comprises an adhesive surface, said adhesive surface mating with said surface of said common electrode whereby said portions of said first terminals are captured between said keeper and said surface of said common electrode.

46. The system recited in claim 44, wherein said keeper is conductive.

47. The system recited in claim 37, wherein the center axes of said plurality of bores are parallel.

48. The system recited in claim 37, wherein the center axes of said plurality of bores are coplanar.

49. The system recited in claim 36, wherein said non-conductive wall structure comprises fiberglass.

50. The system recited in claim 36, wherein said fusible elements comprise silver filaments.

51. The system recited in claim 36, wherein said common electrode comprises a copper bus bar.

52. The system recited in claim 36, wherein said transient-suppressing elements are metal oxide varistors.

53. The system recited in claim 36, wherein each of said plurality of transient-suppressing elements comprise first and second terminals, said first terminals of each of said transient-suppressing elements electrically coupled to a common bus on said printed circuit board and each of said second terminals of said transient-suppressing elements are coupled via said printed circuit board to one of said fusible elements.

54. The system recited in claim 53, wherein said common bus on said printed circuit board comprises a copper bus bar mechanically and electrically coupled to said printed circuit board.

55. The system recited in claim 54, wherein said copper bus bar is coupled to said printed circuit board with a fastener extending through said copper bus bar and at least partially through said printed circuit board.

56. The system recited in claim 55, wherein said fastener comprises a self-threading screw.

57. An apparatus for providing independent over-current protection to a plurality of electrical devices, said apparatus comprising:

a plurality of fusible elements, each of said fusible elements having a first terminal and a second terminal;

at least one non-conductive body surrounding said plurality of fusible elements, said non-conductive body having first and second end portions; and a common electrode electrically coupled to said first terminal of each of said plurality of fusible elements and mechanically coupled to said first end portion of said at least one non-conductive body, said second terminals of each of said plurality of fusible elements electrically isolated by said second end portion of said at least one non-conductive body and couplable to at least one of said plurality of electrical devices, said common electrode couplable to a source of electrical power whereby each of said plurality of fusible elements is operative to open-circuit when an electrical device coupled thereto causes an electrical current to flow through said fusible element in excess of a current rating of said fusible element.

58. The apparatus recited in claim 57, wherein said at least one non-conductive body comprises a plurality of hollow, non-conductive wall structures having first and second end portions, said plurality of fusible elements corresponding to and disposed within said plurality of hollow, non-conductive wall structures, each of said first terminals proximate to said first end portions and each of said second terminals proximate to said second end portions.

59. The apparatus recited in claim 57, wherein said second end portion of said body comprises a member having a plurality of holes therethrough and at least a portion of said second terminal of each of said plurality of fusible elements extends through a corresponding one of said plurality of holes.

60. The apparatus recited in claim 59, wherein said member is non-conductive, whereby said second terminals of said plurality of fusible elements are electrically-isolated.

61. The apparatus recited in claim 57, wherein said second terminals of said fusible elements comprise a conductive pin.

62. The apparatus recited in claim 61, wherein said conductive pins are adapted for coupling to conductive circuit traces on a printed circuit board for coupling to said plurality of electrical devices.

63. The apparatus recited in claim 57, wherein said common electrode comprises an elongated member having a plurality of holes therethrough and at least a portion of said first terminal of each of said plurality of fusible elements extends through a corresponding one of said plurality of holes.

64. The apparatus recited in claim 63, wherein the portions of said first terminals extending through said holes are proximate to a surface of said common electrode.

65. The apparatus recited in claim 64, further comprising a keeper, said portions of said first terminals extending through said common electrode being captured between said keeper and said common electrode.

66. The apparatus recited in claim 65, wherein said keeper comprises an adhesive surface, said adhesive surface mating with said surface of said common electrode whereby said portions of said first terminals are captured between said keeper and said surface of said common electrode.

67. The apparatus recited in claim 65, wherein said keeper is conductive.

68. The apparatus recited in claim 58, wherein the center axes of said plurality of hollow, non-conductive wall structures are parallel.

69. The apparatus recited in claim 58, wherein the center axes of said plurality of hollow, non-conductive wall structures are coplanar.

70. The apparatus recited in claim 57, wherein said at least one non-conductive body comprises fiberglass.

71. The apparatus recited in claim 57, wherein said fusible elements comprise silver filaments.

72. The apparatus recited in claim 57, wherein said common electrode comprises a copper bus bar.

* * * * *